(12) United States Patent
Pande et al.

(10) Patent No.: US 11,546,245 B2
(45) Date of Patent: Jan. 3, 2023

(54) SYSTEM AND METHOD FOR DATA ROUTE DISCOVERY THROUGH CROSS-CONNECTION TUNNELS

(71) Applicant: VMWARE, INC., Palo Alto, CA (US)

(72) Inventors: Ambarish Pande, Pune (IN); Prahalad Deshpande, Pune (IN)

(73) Assignee: VMWARE, INC., Palo Alto, CA (US)

( * ) Notice: Subject to any disclaimer, the term of this patent is extended or adjusted under 35 U.S.C. 154(b) by 203 days.

(21) Appl. No.: 16/996,945

(22) Filed: Aug. 19, 2020

(65) Prior Publication Data
US 2021/0409303 A1 Dec. 30, 2021

(30) Foreign Application Priority Data

Jun. 24, 2020 (IN) .............................. 202041026836

(51) Int. Cl.
*H04L 45/02* (2022.01)
*H04L 12/46* (2006.01)

(52) U.S. Cl.
CPC .......... *H04L 45/02* (2013.01); *H04L 12/4641* (2013.01)

(58) Field of Classification Search
CPC ..... H04L 45/02; H04L 12/4641; H04L 41/12; H04L 61/09
USPC .................................. 370/254; 709/242, 245
See application file for complete search history.

(56) References Cited

U.S. PATENT DOCUMENTS

| | | | |
|---|---|---|---|
| 7,590,074 B1* | 9/2009 | Dondeti | H04L 12/4675 370/254 |
| 7,886,075 B2* | 2/2011 | Molteni | H04L 45/02 709/239 |
| 9,191,139 B1* | 11/2015 | Venkata | H04L 12/6418 |
| 9,634,936 B2* | 4/2017 | Bansal | H04L 45/38 |
| 2004/0039840 A1* | 2/2004 | Dispensa | H04L 45/04 709/242 |
| 2008/0205401 A1* | 8/2008 | Mirtorabi | H04L 69/167 370/392 |
| 2009/0304003 A1* | 12/2009 | Huynh Van | H04L 12/4641 370/395.31 |
| 2009/0304004 A1* | 12/2009 | Huynh Van | H04L 9/30 370/395.31 |
| 2011/0075673 A1* | 3/2011 | Hardie | H04L 45/42 370/401 |
| 2013/0182712 A1* | 7/2013 | Aguayo | H04L 12/4633 370/395.53 |
| 2014/0244851 A1* | 8/2014 | Lee | H04L 45/54 709/228 |
| 2015/0110002 A1* | 4/2015 | Wilkinson | H04W 40/02 370/329 |
| 2015/0143501 A1* | 5/2015 | Cherukuri | H04L 63/0227 726/11 |
| 2017/0214550 A1* | 7/2017 | Kumar | G06F 9/5077 |

(Continued)

*Primary Examiner* — Anthony Mejia
(74) *Attorney, Agent, or Firm* — Loza & Loza, LLP

(57) ABSTRACT

A system and method for data route discovery through cross-connection tunnels uses routing configurations from a local edge router in a private cloud that include learnt and advertised subnets, as well as cross-connection tunnels for the learnt and advertised subnets, to populate a public cloud table of public cloud learnt subnets and a public cloud table of public cloud advertised subnets. The public cloud tables of public cloud learnt subnets and public cloud advertised subnets are applied to discover data routes through the cross-connection tunnels of the hybrid cloud environment.

20 Claims, 6 Drawing Sheets

(56) References Cited

U.S. PATENT DOCUMENTS

| | | | |
|---|---|---|---|
| 2017/0272192 A1* | 9/2017 | Qu | H04L 45/00 |
| 2019/0089620 A1* | 3/2019 | Hefei | H04L 45/02 |
| 2019/0253274 A1* | 8/2019 | Van Dussen | H04L 12/4641 |
| 2020/0136963 A1* | 4/2020 | Chen | H04L 45/34 |
| 2020/0358672 A1* | 11/2020 | Lange | H04L 41/5096 |
| 2021/0144084 A1* | 5/2021 | Dubey | H04L 45/566 |
| 2021/0359929 A1* | 11/2021 | Cronin | H04L 45/02 |

\* cited by examiner

SYSTEM AND METHOD FOR DATA ROUTE DISCOVERY THROUGH CROSS-CONNECTION TUNNELS

RELATED APPLICATIONS

Benefit is claimed under 35 U.S.C. 119(a)-(d) to Foreign Application Serial No. 202041026836 filed in India entitled "SYSTEM AND METHOD FOR DATA ROUTE DISCOVERY THROUGH CROSS-CONNECTION TUNNELS", on Jun. 24, 2020, by VMware, Inc., which is herein incorporated in its entirety by reference for all purposes.

BACKGROUND

Hybrid networks offer a combination of local or on-premises networks and subnetworks connected to cloud networks and subnetworks. The cloud portion may be provided by a third party public cloud provider and the connection to the public cloud provider may be provided by some form of a cross-connection tunnel or virtual private network. While the network structure of the public cloud provider is presented as gateway routers, nodes, subnetworks and other structures, these may be implemented in virtual machines and in abstractions. As a result, the customer's knowledge of the public cloud network is imprecise and much of the information that does exist may not be disclosed. This lack of information applies also to the cross-connection tunnels.

Models of network topology are often captured in networking environments and used for the purposes of troubleshooting, security monitoring and management, bandwidth utilization and network performance monitoring, inter alia. In a hybrid environment with on-premises and cloud resources, a deep level of visibility into the use of cross-connection tunnels allows administrators to determine traffic flows, resource usage, provisioning limitations, micro-segmentation and planning, topology troubleshooting and bandwidth monitoring.

SUMMARY

A system and method for data route discovery through cross-connection tunnels uses routing configurations from a local edge router in a private cloud that include learnt and advertised subnets, as well as cross-connection tunnels for the learnt and advertised subnets, to populate a public cloud table of public cloud learnt subnets and a public cloud table of public cloud advertised subnets. The public cloud tables of public cloud learnt subnets and public cloud advertised subnets are applied to discover data routes through the cross-connection tunnels of the hybrid cloud environment.

A computer-implemented method determining data routes in a hybrid cloud environment through cross-connection tunnels receiving routing configurations including learnt and advertised subnets from a local edge router of a private cloud, the received configurations including cross-connection tunnels for the learnt and advertised subnets, populating a public cloud table of public cloud learnt subnets with the advertised subnets from the local edge router and the corresponding received cross-connection tunnels for the respective subnets from the local edge router, populating a public cloud table of public cloud advertised subnets with the learnt subnets from the local edge router and the corresponding received cross-connection tunnels for the respective subnets from the local edge router, and applying the populated public cloud tables of learnt subnets and of advertised subnets to discover data routes through the cross-connection tunnels of the hybrid cloud environment. In some embodiments, the steps of this method are performed when program instructions contained in a computer-readable storage medium are executed by one or more processors.

A system of determining data routes in a hybrid cloud environment through cross-connection tunnels includes a memory and at least one processor. The processor is configured to receive routing configurations including learnt and advertised subnets from a local edge router of a private cloud, the received configurations including cross-connection tunnels for the learnt and advertised subnets, to populate a public cloud table of public cloud learnt subnets with the advertised subnets from the local edge router and the corresponding received cross-connection tunnels for the respective subnets from the local edge router, to populate a public cloud table of public cloud advertised subnets with the learnt subnets from the local edge router and the corresponding received cross-connection tunnels for the respective subnets from the local edge router, and to apply the populated public cloud tables of learnt subnets and of advertised subnets to discover data routes through the cross-connection tunnels of the hybrid cloud environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
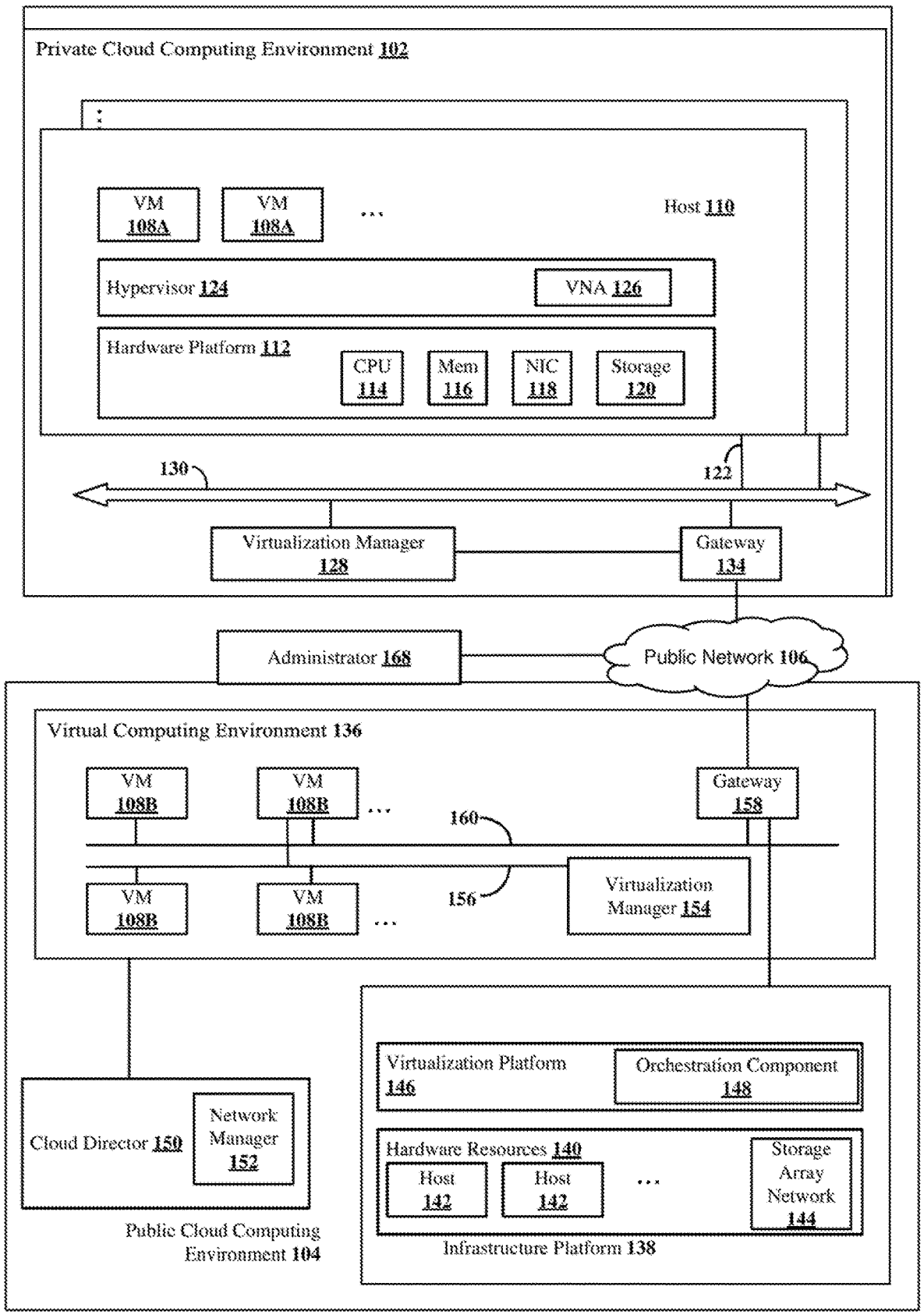
FIG. 1 is a block diagram of a hybrid cloud system suitable for an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments presented herein relate to systems and methods for network topology construction. In this specification, the terms "logical network entity," "logical network element," and the like will refer to software-defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

Turning now to FIG. 1, a block diagram of a hybrid cloud system in accordance with an embodiment of the invention is shown. The hybrid cloud system includes at least one private cloud computing environment 102 and at least one public cloud computing environment 104 that are connected via a public network 106, such as the Internet. The hybrid cloud system is configured to provide a common platform for managing and executing workloads seamlessly between the private and public cloud computing environments. In one embodiment, the private cloud computing environment may be controlled and administered by a particular enterprise or business organization, while the public cloud computing environment may be operated by a cloud computing service provider and exposed as a service available to account holders or tenants, such as the particular enterprise in addition to other enterprises.

In some embodiments, the private cloud computing environment may comprise one or more on-premise data centers. The public cloud computing environment 104 provides a virtual private cloud to augment the private cloud computing environment 102. The connections may be made through virtual private networks or other cross-connection tunnels, including virtual interfaces.

The private and public cloud computing environments 102 and 104 of the hybrid cloud system include computing and/or storage infrastructures to support a number of virtual computing instances 108A and 108B. As used herein, the term "virtual computing instance" refers to any software entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being VMs, although embodiments of the invention described herein are not limited to VMs.

The VMs 108A and 108B running in the private and public cloud computing environments 102 and 104, respectively, may be used to form virtual data centers using resources from both the private and public cloud computing environments. The VMs within a virtual data center can use private IP (Internet Protocol) addresses to communicate with each other since these communications are within the same virtual data center. However, in conventional cloud systems, VMs in different virtual data centers require at least one public IP address to communicate with external devices, i.e., devices external to the virtual data centers, via the public network. Thus, each virtual data center would typically need at least one public IP address for such communications.

Since public IP addresses are a limited resource, assigning at least one public IP address for each of the virtual data centers supported by a public cloud computing environment, which may be hundreds or thousands of virtual data centers, is not an efficient management of public IP addresses. In addition, since tenants of a public cloud computing environment may be charged for additional public IP addresses, there is a financial incentive to reduce the number of public IP addresses needed for virtual data centers of the public cloud tenants. As described in detail below, the hybrid cloud system employs an efficient routing technique using a virtual overlay network to manage public IP addresses used by the virtual data centers supported by the public cloud computing environment, which can conserve the number of public IP address used by the virtual data centers.

As shown in FIG. 1, the private cloud computing environment 102 of the hybrid cloud system includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a physical network 122 within the private cloud computing environment 102.

The physical network 122 may include physical hubs, physical switches and/or physical routers that interconnect the hosts 110 and other components in the private cloud computing environment 102. The network interface 118 may be one or more network adapters, such as a Network Interface Card (NIC). The storage system 120 represents local storage devices (e.g., one or more hard disks, flash memory modules, solid state disks and optical disks) and/or a storage interface that enables the host 110 to communicate with one or more network data storage systems. An example of a storage interface is a host bus adapter (HBA) that couples the host 110 to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host 110.

Each host 110 may be configured to provide a virtualization layer that abstracts processor, memory, storage and networking resources of the hardware platform 112 into the virtual computing instances, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host 110 may include other virtualization software platforms to support those processing entities, such as the Docker virtualization platform to support software containers.

In the illustrated embodiment, the host 110 also includes a virtual network agent 126. The virtual network agent 126 operates with the hypervisor 124 to provide virtual networking capabilities, such as bridging, L3 routing, L2 Switching and firewall capabilities, so that software-defined networks or virtual networks can be created. The virtual network agent 126 may be part of a VMware NSX® virtual network product installed in the host 110. In a particular implementation, the virtual network agent 126 may be a virtual extensible local area network (VXLAN) endpoint device (VTEP) that operates to execute operations with respect to encapsulation and decapsulation of packets to support a VXLAN backed overlay network.

The private cloud computing environment 102 includes a virtualization manager 128 that communicates with the hosts 110 via a management network 130. In an embodiment, the virtualization manager 128 is a computer program that resides and executes in a computer system, such as one of the hosts 110, or in a virtual computing instance, such as one of the VMs 108A running on the hosts. One example of the virtualization manager 128 is the VMware vCenter Server® product made available from VMware, Inc. The virtualization manager 128 is configured to carry out administrative tasks for the private cloud computing environment 102, including managing the hosts 110, managing the VMs 108A running within each host, provisioning new VMs, migrating the VMs from one host to another host, and load balancing between the hosts.

The virtualization manager 128 is configured to control network traffic into the public network 106 via a private cloud gateway device 134, which may be implemented as a virtual appliance. The gateway device 134 is configured to provide the VMs 108A and other devices in the private cloud computing environment 102 with connectivity to external devices via the public network 106. The gateway device 134 serves as a perimeter edge router for the on-premises or co-located computing environment 102 and stores routing tables, network interface layer or link layer information and policies, such as IP security policies, for routing traffic between the on-premises and one or more remote computing environments.

The public cloud computing environment 104 of the hybrid cloud system is configured to dynamically provide enterprises (referred to herein as "tenants") with one or more virtual computing environments 136 in which administrators of the tenants may provision virtual computing instances, e.g., the VMs 108B, and install and execute various applications. The public cloud computing environment 104 includes an infrastructure platform 138 upon which the virtual computing environments 136 can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the VMs 108B across the hosts 142. The virtualization platform 146 may be implemented using one or more software programs that reside and execute in one or more computer systems, such as the hosts 142, or in one or more virtual computing instances, such as the VMs 108B, running on the hosts 142.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXI®-based hypervisor technologies provided by VMware, Inc. However, the virtualization platform may be implemented using any other virtualization technologies, including Xen®, Microsoft Hyper-V® and/or Docker virtualization technologies, depending on the processing entities being used in the public cloud computing environment 104.

In one embodiment, the public cloud computing environment 104 may include a cloud director 150 that manages allocation of virtual computing resources to different tenants. The cloud director 150 may be accessible to users via a REST (Representational State Transfer) API (Application Programming Interface) or any other client-server communication protocol. The cloud director 150 may authenticate connection attempts from the tenants using credentials issued by the cloud computing provider. The cloud director receives provisioning requests submitted (e.g., via REST API calls) and may propagate such requests to the orchestration component 148 to instantiate the requested VMs (e.g., the VMs 108B). One example of the cloud director 150 is the VMware vCloud Director® product from VMware, Inc.

In one embodiment, the cloud director 150 may include a network manager 152, which operates to manage and control virtual networks in the public cloud computing environment 104 and/or the private cloud computing environment 102. Virtual networks, also referred to as logical overlay networks, comprise logical network devices and connections that are then mapped to physical networking resources, such as physical network components, e.g., physical switches, physical hubs and physical routers, in a manner analogous to the manner in which other physical resources, such as compute and storage, are virtualized. In an embodiment, the network manager 152 has access to information regarding the physical network components in the public cloud computing environment 104 and/or the private cloud computing environment 102. With the physical network information, the network manager 152 may map the logical network configurations, e.g., logical switches, routers, and security devices to the physical network components that convey, route, and filter physical traffic in in the public cloud computing environment 104 and/or the private cloud computing environment 102. In one implementation, the network manager 152 is a VMware NSX® manager running on a physical computer, such as one of the hosts 142, or a virtual computing instance running on one of the hosts.

In one embodiment, at least some of the virtual computing environments 136 may be configured as virtual data centers. Each virtual computing environment includes one or more virtual computing instances, such as the VMs 108B, and one or more virtualization managers 154. The virtualization managers 154 may be similar to the virtualization manager 128 in the private cloud computing environment 102. One example of the virtualization manager 154 is the VMware vCenter Server® product made available from VMware, Inc. Each virtual computing environment may further include one or more virtual networks 156 used to communicate between the VMs 108B running in that environment and managed by at least one public cloud networking gateway device 158 as well as one or more isolated internal networks 160 not connected to the public cloud gateway device 158. The gateway device 158, which may be a virtual appliance, is configured to provide the VMs 108B and other components in the virtual computing environment 136 with connectivity to external devices, such as components in the private cloud computing environment 102 via the network 106.

The public cloud gateway device 158 operates in a similar manner to the private cloud gateway device 134 in the private cloud computing environment. The public cloud gateway device 158 operates as a remote perimeter edge router for the public cloud computing environment and stores routing tables, network interface layer or link layer information and policies such as IP security policies for routing traffic between the on-premises and one or more remote computing environments.

An administrator 168 is coupled to both of the edge routers 134, 158 and any other routers on the edge of either network through the public network 106 and is able to collect publicly exposed connection information such as routing configurations, routing tables, network interface layer information, local link layer information, policies, etc. The administrator is able to use this information to build a network topology for use in troubleshooting, visibility and administrative tasks. In some hybrid cloud scenarios, the information about vendor-specific communication mechanism constructs is not necessarily available via the public APIs that are exposed by cloud vendors. As described herein, the administrator is a node in either network or an external node as shown. As such it includes a network interface adapter and processing resources such as processors and memories in a manner similar to the other nodes shown in this description.

A request to the public cloud edge router 158 may not reveal enough information to build a complete topology that can be used for administration and troubleshooting. With a diverse set of vendors, there are many different mechanisms by which the private cloud communicates with the public cloud, such as IPsec/L2 VPN (Virtual Private Network), Direct-Connect (AWS), ExpressRoute™ (Azure™), Google Interconnect (GCP), or SD-WAN (Software-Defined Networking in a WAN) (VeloCloud™ by VMware). These different connectivity mechanisms are referred to generally as cross-connection tunnels and act between the private cloud gateway router 134 and the public cloud gateway router 158. While these tunnels are known, not all of the related subnetwork is known for each cross-connection tunnel. This may make it difficult to create a single network topology for the hybrid cloud. The administrator 168 combines the exposed information to build the network topology based in part on inferences.

The administrator 168 may collect and analyze routing configurations, routing tables and flow records in order to determine security policies, identify dependencies, migrate workloads, allocate resources, and the like. For example, the administrator 168 may be associated with a service provider (e.g., a provider of database services, streaming services, web services, or the like) that serves a plurality of endpoints in a hybrid networking environment. The hybrid networking environment may include non-unique IP addresses that may overlap with other IP addresses so it may be difficult to identify a source and destination workload of a flow record based on a source and destination IP address. This also limits visibility into traffic patterns and application dependencies that may be useful to build a network topology.

Techniques described herein, such as identification of administrative domains and their relationships, can also be applied to other networking-related problems like routing, reachability, and various types of analytics. While embodiments are described herein with respect to particular networking problems such as edge routing and subnets, other embodiments may be employed without departing from the scope of the present disclosure.

Furthermore, while certain techniques are described herein as involving the use of tables, it is understood that other types of data structures may be employed. Tables are merely included in this disclosure as one example, and any manner of storing associations among data may be used. For example, the routing information, the network interface information, and subnet identification tables may be implemented using a variety of types of data structures other than tables without departing from the scope of the present disclosure, such as hashes, vectors, stateless databases, databases, tree structures, etc.

Figure 2:
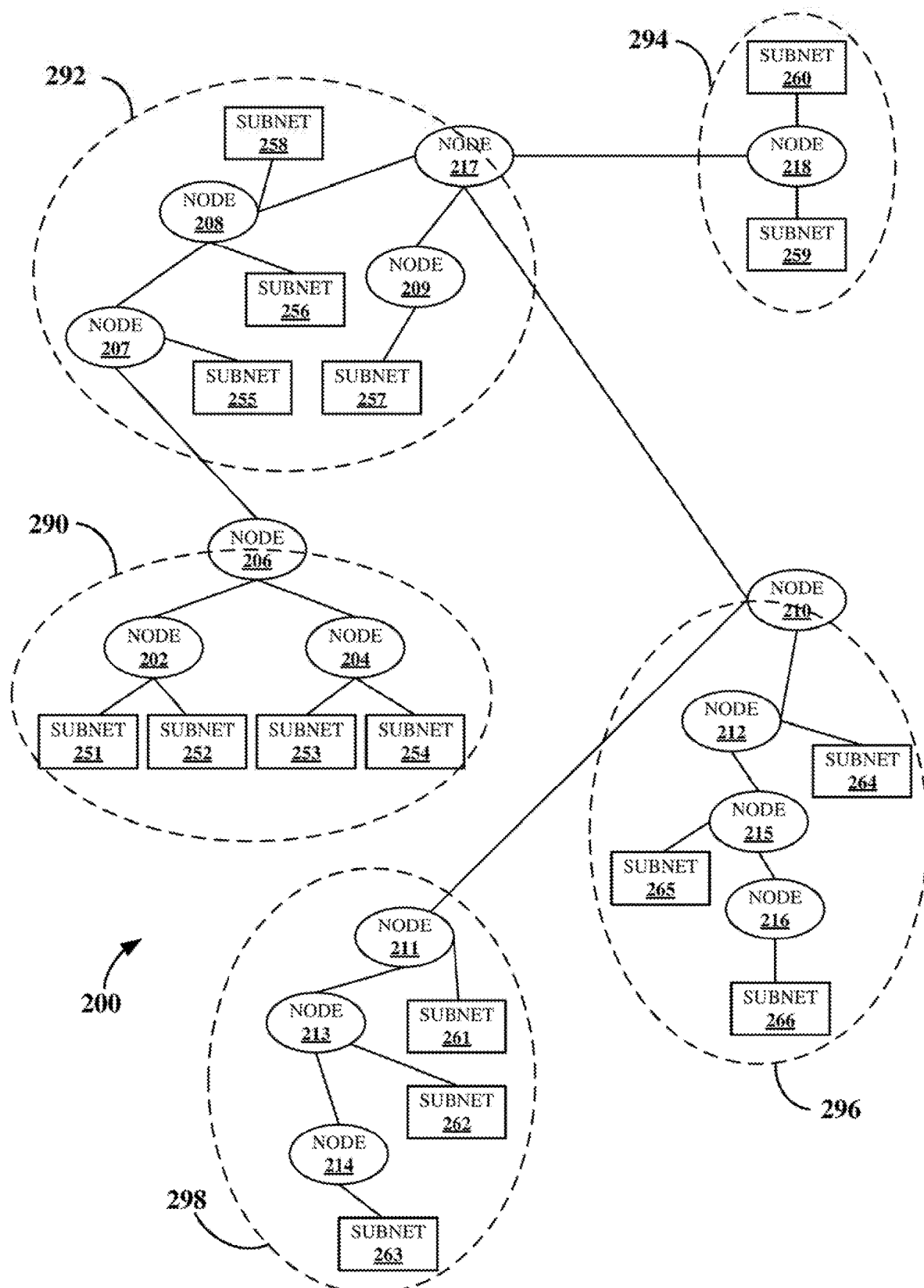
FIG. 2 is a diagram of connected networks with edge nodes and subnets suitable for an embodiment of the invention.

FIG. 2 illustrates an example of administrative domains 290, 292, 294, 296, 298 each housing subnets 251-266 within a network topology 200. The topology 200 includes a plurality of edge nodes 202, 204, 206, 207, 208, 209, 210, 211, 212, 213, 214, 215, 216, 217, and 218 at the perimeter of each administrative domain. The subnets (251-266) are connected to other administrative domains through the edge nodes. For example, each edge node may represent a gateway or perimeter router and each subnet may represent a group of IP addresses that are potentially reachable from the respective gateway. In some embodiments, the network topology 200 is generated based on network data (e.g., topology and routing data) received from endpoints such as the edge nodes.

Administrative domains 290, 292, 294, 296, and 298 may also be determined based on the topology and routing information. For example, each administrative domain may represent an isolated section of the network topology 200 that is hidden behind a direction of isolation rule. Each subnet within an administrative domain may be unique. Furthermore, each subnet reachable from an administrative domain may also be unique.

In some embodiments, workloads in a network environment are initially assigned to a global administrative domain. As operations continue, workloads are then moved from the global administrative domain to more specific administrative domains. Determining administrative domains may involve different steps for different types of networks. For example, in an environment involving NAT (Network Address Translation), NAT information may be included in the network data, and may be used in determining administrative domains. In an AWS (Amazon Web Services) environment, VPCs (Virtual Private Clouds) are created that include subnets. Each subnet within a VPC is unique, and any two VPCs can be peered if they do not include any overlapping subnets. As such, in an AWS environment, VPC and peer information may be used in determining administrative domains.

Other examples of determining administrative domains may include breaking a network environment into administrative domains such that each VNIC (Virtual Network Interface Controller) is in a separate administrative domain, choosing administrative domains such that all interfaces in a given L3 subnet are included in an administrative domain, and choosing administrative domains such that all subnets in a particular AWS VPC are included in a single administrative domain.

In one embodiment, the network topology 200 is modeled as a graph in which each node corresponds to an edge router and each edge router corresponds to a network link between corresponding edge routers. Where NAT rules apply, NAT direction properties are set for each applicable node, and nodes subject to NAT rules may be removed from the graph. A BFS (Breadth First Search) may then be performed in order to identify isolated sections (or "islands") in the graph. All of the nodes within an isolated section may then be grouped in an administrative domain (e.g., 290, 292, 294, 296, and 298).

As mentioned, the administration of the network is aided by understanding how different cross-connect tunnels between the private cloud computing system and the virtual private cloud computing system are being used. To this end, subnetworks and addresses are linked to the cross-connect tunnels. In some embodiments, the administrator accurately determines the topology of a hybrid connection, such as through a virtual interface, between the on-premise data center and a VMC SDDC (Software-Defined Data Center) or native AWS VPC (Virtual Private Cloud) over AWS DX.

In some embodiments, the administrator fetches subnets for each virtual interface and uses this fetched routing information to determine connections between the private network and the virtual private network. In doing this there is a lack in the available routing information due to abstractions that are used by the public cloud computing environment. In particular, many public cloud computing environments do not provide the learnt and advertised subnets for each cross-connection tunnel.

As an example, the AWS DX connection between an actual AWS entity, such as a VGW (Virtual Private Gateway) or ENA (Elastic Network Adapter), and the private cloud gateway is not available. In the context of AWS for example, the public cloud provider may provide some information, but this is not segregated by the corresponding VIF (Virtual Interface) that serves as the cross-connection tunnel in the AWS DX context. A local ASN (Autonomous System Number) is provided for use in BGP (Border Gateway Protocol) routing. A list of learnt subnets at the SDDC level is provided without any segregation or association with any particular VIF. A list of advertised subnets at the SDDC level is provided also without any per VIF segregation. By contrast BGP Peering information is provided associated with each VIF. This Peering information includes a local IP address, a peer IP address, and a peer ASN)

In some implementations, traffic through different VIF's cannot be distinguished because there is no information to relate the learnt and advertised subnets to a particular VIF. When there is more than one DX VIF configured between a given public cloud provider and a private cloud environment, it is not possible to determine the correct VIF involved in the data transfer.

Figure 3:
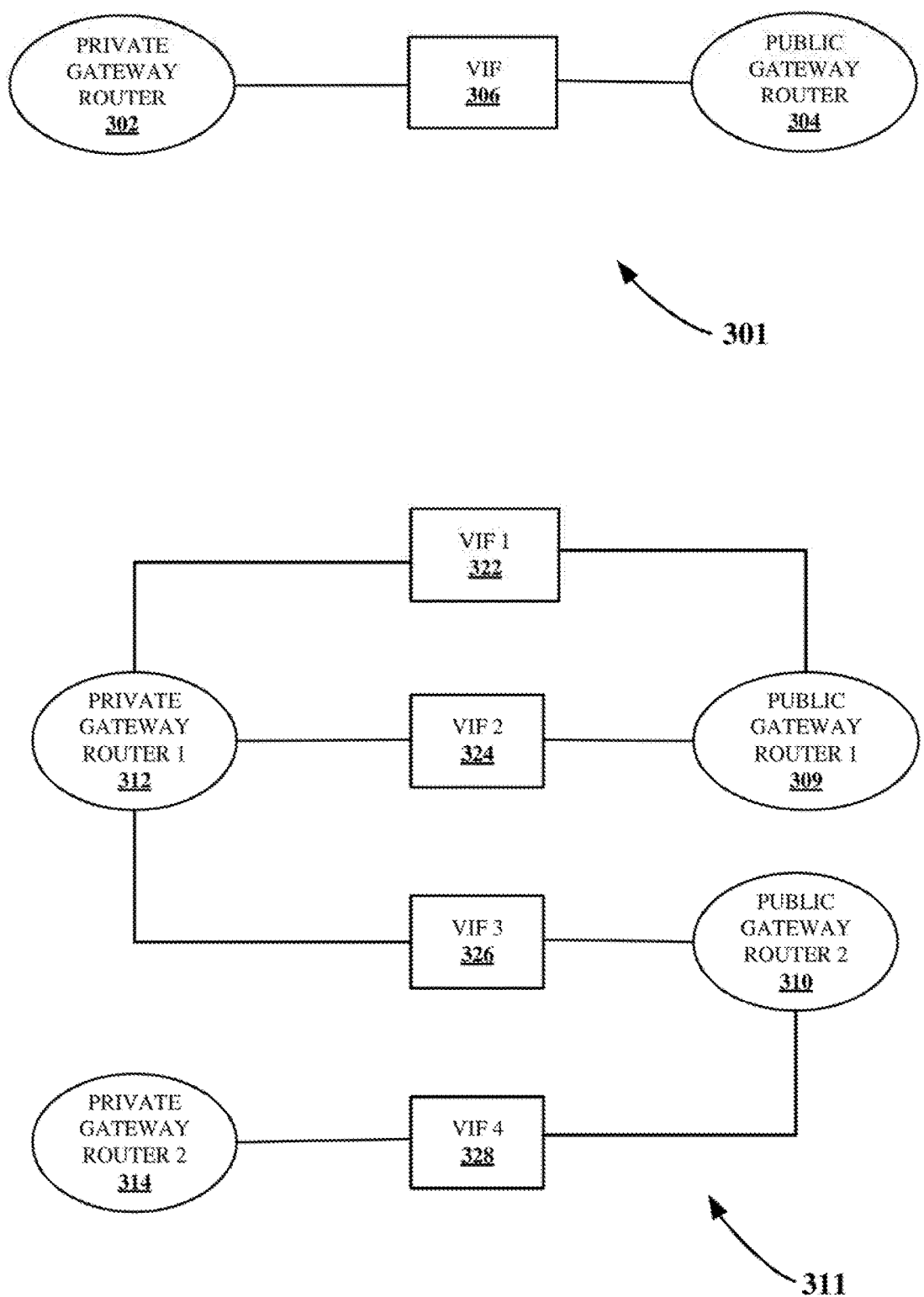
FIG. 3 is a diagram of a connectivity between private and public cloud routers in a hybrid cloud environment suitable for an embodiment of the invention

FIG. 3 is a diagram of private network gateway routers connected to public gateway routers through VIFs. In the first topology 301, a private gateway router 302 is coupled to a public gateway router 304 through a VIF 306. All of the traffic is routed through the one VIF and so the network can easily be analyzed, and traffic may be optimized. The gateway routers may also be referred to as edge or perimeter routers for the respective network or subnetwork. The administrator is able to send show commands to the IP address of the edge routers and the VIF as a BGP neighbor and obtain local ASN's, local IP addresses, BGP neighbor ASN's and BGP neighbor IP addresses for the VIF. This provides a clear connection between the BGP attributes and this one particular VIF.

The second topology 311 features multiple gateway routers and multiple VIFs so that the routing is not as well known. A first private gateway router 312 is connected to a first public gateway router 309 through both of two different VIFs 322, 324, labeled as VIF1 and VIF2. Some of the traffic will go through the first VIF and some of the traffic will go through the second VIF and the choice of VIF may or may not depend on the destination address. The first private gateway router 312 is also coupled to a second cloud gateway router 310 through a third VIF 326. In this example, all of the traffic between the first private gateway router and the second public gateway router is through the third VIF. A second private gateway router 314 is connected to the second public gateway router 310 through a fourth VIF 328. The second private gateway router 314 is not connected to the first public gateway router 309 or to any other VIF.

There are many reasons to provision multiple VIFs between the cloud edge router and the on-premise edge router. As one example, a VIF may be used as a basic unit of multi-tenancy and may be provisioned using different VIFs for different departments or sub-organizations within an enterprise. A Direct Connect connection may be a high-powered expensive technology and allows enterprises to share that across sub-organizations within it using multiple VIFs. To do this sharing traffic from e.g. the finance department of the company may go to the upstream cloud via VIF 1 whereas that of a Human Resources department may go to the upstream cloud via VIF 2.

As shown, some traffic must flow through a particular VIF to reach the intended gateway, but other traffic might flow through one of two or more different VIFs to reach the intended gateway. In the topology 311 with multiple VIFs, the administrator can fetch the VIF addresses from the public gateway routers, but the administrator cannot know the learnt and advertised subnets for each VIF because this information is not exposed. As a result, the administrator cannot determine which packet uses which VIF. In some systems, each VIF is an expensive resource and subnets of the private network are allocated to particular VIFs. However, without knowing cloud networks for each VIF, the administrator cannot optimize traffic to obtain the best usage for each VIF.

The diagrams of FIG. 3 may be built by first fetching the IP address of each connected VIF from each public gateway router. The first public gateway router 309 should reply with the IP addresses for the first three VIFs 322, 324, 326. The second public gateway 310 should reply with the IP addresses for the third and fourth VIFs 326, 328. These replies indicate which public gateway routers are connected to which VIFs. The connections to the private gateway routers 312, 314 may be determined with ping commands or in a variety of other ways. A show BGP neighbors command may be used as described below in which at least some of the neighbor IP addresses are VIF addresses.

An administrator may use pings, show commands, and other structures to fetch learnt and advertised subnets from each of the gateway or edge routers and for each of its BGP neighbors. These neighbors may include the VIFs connected to each gateway router. This information may also be used to build a network topology for the hybrid cloud environment. The edge routers serve as the endpoints of the connections. Their routing information may be collected as the advertised routes for connected other routers.

In a BGP (Border Gateway Protocol) peering environment routes will be advertised to peer neighbor BGP nodes. As an example, a perimeter router, may send an advertised routes command to a BGP neighbor identified as 172.16.232.178. This may be done using, for example, "show ip bgp neighbors 172.16.232.178 advertised-routes." This is a command to show BGP and TCP connections to the indicated neighbor on all the routes that have been advertised to the indicated neighbor. Other similar commands may be used for other protocols and other configurations. The result returned may be similar to that shown below in Table 1, although this is simplified to show only two subnet entries in the Network column. The list of subnets in the Network column are the subnets that are advertised to the queried BGP neighbor and may therefore be the subnets of the perimeter router that sent the show command.

Table 2 shows example results from a received routes command, such as "show ip bgp neighbors 172.16.232.178 received routes." This is a command to show BGP and TCP connections to the indicated neighbor on all the routes that have been received by the indicated neighbor whether the route has been accepted or rejected. Other similar commands may be used for other protocols and other configurations. The list of local and remote subnets shown in the network column in this case are from the received routes from any other edge router.

TABLE 1

BGP Advertised Routes

| Network | Next Hop | Metric | LocPrf | Weight | Path |
|---|---|---|---|---|---|
| *>i10.0.0.0/24 | 172.16.232.179 | 0 | 100 | 0 | ? |
| *10.20.2.0/24 | 10.0.0.0 | 0 | | 32768 | i |

BGP table version is 27, local router ID is 172.16.232.181 Status codes: s suppressed, d damped, h history, *valid, >best, i-internal Origin codes: i-IGP, e-EGP, ?-incomplete

TABLE 2

BGP Received Routes

| Network | Next Hop | Metric | LocPrf | Weight | Path |
|---|---|---|---|---|---|
| *i172.16.1.0/24 | 172.16.232.181 | 0 | 100 | 100 | i |
| *172.17.1.0/24 | 192.168.2.2 | 300 | 32768 | 100 | 65502 i |

BGP table version is 27, local router ID is 172.16.232.181 Status codes: s suppressed, d damped, h history, *valid, >best, i-internalOrigin codes: i-IGP, e-EGP, ?-incomplete The information in the above tables may be combined to provide tables of IP addresses for various routes and to show all the subnet connections. These may be compiled to produce results such as Tables 3 and 4 below. At the same time, the information related to the ASN's shown in Table 3 and 4 is not found from Table 1 or Table 2 but from the show commands mentioned above.

Table 3 provides an example of information that may be obtained from two different example routing entities at the perimeter of a network. The first router is a perimeter edge router for an on-premises network such as the private cloud gateway router 134 of FIG. 1. The second router is a perimeter edge router for a cloud provider network, such as the public cloud gateway router 156 of FIG. 1. This information is for a network that uses BGP (Border Gateway Protocol) and ASN (Autonomous System Number) IDs such as a peering system with DX, ExpressRoute or Interconnect. As shown, each routing entity has local and remote routing information for subnets within its network. This information may be compared to infer topology of the network. Table 4 shows similar example information for a system that uses VPN connectivity.

TABLE 3

Connectivity Mechanism: DX/ExpressRoute/Interconnect

| Routing Entity | Connection Information | Applicable Subnets |
|---|---|---|
| On-premise Perimeter edge | Local BGP Identifier-BGPId1<br>Local ASN-ASN1<br>BGP Neighbor-BGPId2<br>BGP Neighbor ASN ASN2 | On-premise subnets behind the edge-<br>S1, S2, S3 |
| Cloud provider perimeter edge | Local BGP Identifier-BGPId2<br>Local ASN-ASN2<br>BGP Neighbor-BGPId1<br>BGP Neighbor ASN-ASN1 | Cloud subnets behind perimeter edge-<br>CS1, CS2, CS3 |

TABLE 4

Connectivity Mechanism: VPN

| Routing Entity | Connection Information | Applicable Subnets |
|---|---|---|
| On-premise Perimeter edge | Local Public IP Address-IP1<br>Remote Public IP Address-IP2<br>Local Id-ID1<br>Remote Id-ID2 | On-premise subnets behind the edge-<br>S1, S2, S3 |

TABLE 4-continued

Connectivity Mechanism: VPN

| Routing Entity | Connection Information | Applicable Subnets |
|---|---|---|
| Cloud provider perimeter edge | Local Public IP Address-IP2 Remote Public IP Address-IP1 Local Id-ID2 Remote Id-ID1 | Cloud subnets behind perimeter edge-CS1, CS2, CS3 |

As shown in Tables 3 and 4, even though the information about vendor-specific communication mechanism constructs is not necessarily available via the public APIs exposed by cloud vendors and even though there are many different mechanisms for the private cloud to communicate with the public cloud, the terminating ends of the connection, the edge routers, still hold enough information to build the connection topology between the two. The network topology may still be inferred by applying certain heuristics on the configuration information that is available. As an example, in Table 3, a Local Public IP Address indicated as IP1 at the on-premise perimeter edge can be connected to the same address IP1 at the cloud provider perimeter edge to deduce a connection though the perimeters to a network node with this one address IP1. The Local ID (Identifier) ID1 at the on-premise perimeter edge in the same way can be inferred to be connected to the corresponding Remote ID, ID1 at the cloud provider perimeter edge. The node with address IP1 can then be linked to its related list of subnets S1, S2, or S3. The VPN connectivity includes information about the IP subnets to which the connection applies.

In the same way, address IP2 is available as a remote public IP address at the on-premise perimeter edge and also as a local public IP address at the cloud provider perimeter edge. Local ID ID2 at the cloud provider perimeter edge can be connected to ID2 as the remote ID at the on-premise perimeter edge. A connection can be inferred and linked to the cloud subnets CS1, CS2, or CS3. These connections may be used to reliably deduce a network topology in a hybrid cloud environment even in the absence of routing information in sections of the network. While only two IP addresses and two ID's are shown, there may be many more in use in any actual perimeter edge node.

Table 3 relates to connectivity mechanisms that use BGP ASN. There are a variety of different such vendor-specific systems. In the first example, the on-premise perimeter edge connects with a node that has a local BGP ID of 1 (BGPId1) and a local ASN of 1 (ASN1). It can then be inferred that this connects at the cloud perimeter edge to the BGP Neighbor node with BGPId1 and BGP Neighbor ASN of ASN 1.

Similarly, the BGP Neighbor node with BGPId2 and ASN2 at the on-premise perimeter edge is connected to the local node at the cloud provider perimeter edge with the same BGPId of 2 and ASN of 2. The cloud subnets CS1, CS2, and CS3 and local subnets S1, S2, S3 are also revealed in these tables with their connectivity information. Accordingly, the terminating ends (on-premise perimeter edge and cloud provider perimeter edge) of the connection to e.g. BGPId1, ASN1 are used to build the connectivity topology between the on-premises network and the cloud provider network even without any routing information.

Table 4 relates to other VPN connections, but a hybrid cloud environment may involve one or more other connectivity mechanisms that may be vendor specific. As with the BGP example of Table 3 the subnet information is also available for this connection.

Figure 4:
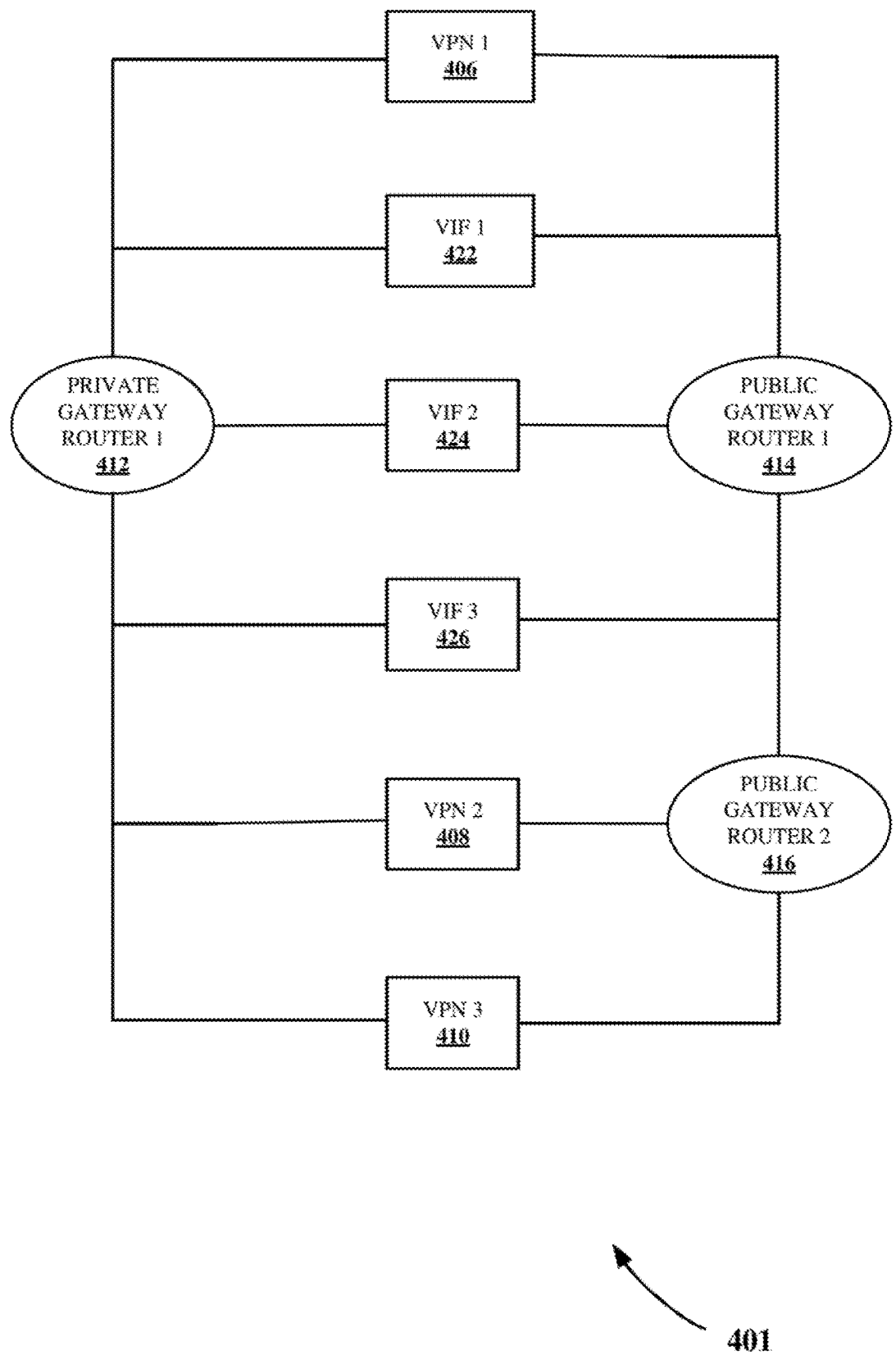
FIG. 4 is a diagram of a connectivity between private and public cloud routers including VPN connectivity in a hybrid cloud environment suitable for an embodiment of the invention

FIG. 4 is a diagram of a topology 401 that uses both virtual interfaces and virtual private networks to connect edge routers. A private gateway router 412 is connected to a public gateway router 414 through a first VIF 422, a second VIF 424, a third VIF 426, or a VPN 406. The private gateway router 412 is connected to a second public gateway router 416 through the third VIF 426, a second VPN 408 or a third VPN 410. This topology allows for more paths in the case of an outage. It allows for different connection paths in the event that one path is preferred over the other for reasons of cost, reliability, speed or another reason. As an example, the first public gateway router 414 may be accessed through the VPN 406 until that path becomes congested or exhausted and then traffic may be diverted through any one of the three possible VIFs 422, 424, 426.

Table 5 is an example of fetched results that may be obtained from a BGP neighbor. In this case the neighbors are the first 322, second 324, and third 326 VIFs that are all neighbors of the first private gateway router 312 as shown in FIG. 3. The results may be fetched by using the VIF IP address as the neighbor address in the show BGP neighbor command or using other commands. The subnets are shown to illustrate the principles herein and do not conform to any actual subnetwork. As mentioned above, the IP address for each VIF may be fetched from the public cloud gateway routers. When sending the commands to fetch subnets from BGP neighbors, any invalid or not connected neighbor IP address will not return a list of subnets. In this way, the administrator may validate which VIFs are connected to any particular private gateway router.

TABLE 5

Private Gateway Router 1

| Neighbor | Learnt Subnets | Advertised Subnets |
|---|---|---|
| VIF 1 | 1.1.1.1/24 | 2.2.2.2/24 |
| VIF 2 | 3.3.3.3/24 | 4.4.4.4/24 |
| VIF 3 | 5.5.5.5/24 | 6.6.6.6/24 |

In the same way the second private gateway router 314 may send a command to its one VIF neighbor 328 VIF 4 and obtain a list such as that of Table 6.

TABLE 6

Private Gateway Router 2

| Neighbor | Learnt Subnets | Advertised Subnets |
|---|---|---|
| VIF 4 | 5.5.5.5/24 | 7.7.7.7/24 |

Having determined the learnt and advertised subnets for each VIF the advertised and learnt subnets for the public cloud gateways can be determined. Tables 5 and 6 illustrate the routing configurations including learnt and advertised subnets that may be received from a local perimeter edge router. These include the VIFs, or cross-connection tunnels for the learnt and advertised subnets. The value indicated e.g. as VIF 1 indicates an actual IP address for the designated VIF. These subnet values may be used to populate a table of public cloud learnt subnets with the advertised subnets from the local perimeter edge router and the corresponding received cross-connection tunnels for the respective subnets from the local perimeter edge router. Similarly, a table of public cloud advertised subnets may be populated with the learnt subnets from the local perimeter edge router and the corresponding received cross-connection tunnels for the respective subnets from the local perimeter edge router. These tables are combined below in which Table 7 is the learnt and advertised subnets tables for Public Gateway Router 1 and Table 8 is the learnt and advertised subnets tables for Public Gateway Router 2.

TABLE 7

Public Gateway Router 1

| VIF | Learnt Subnets | Advertised Subnets |
|---|---|---|
| VIF 1 | 2.2.2.2/24 | 1.1.1.1/24 |
| VIF 2 | 4.4.4.4/24 | 3.3.3.3/24 |

TABLE 8

Public Gateway Router 2

| VIF | Learnt Subnets | Advertised Subnets |
|---|---|---|
| VIF 3 | 6.6.6.6/24 | 5.5.5.5/24 |
| VIF 4 | 7.7.7.7/24 | 6.6.6.6/24 |

With the tables populated, the learnt and advertised subnets are known for each VIF and the same process may be performed for VPNs to relate subnets to each available VPN. The tables allow for a determination of the VIF that is used in communication with a given destination IP address. As an example, a destination IP address may be mapped to a learnt subnets column of a source router table such as Table 5 or 6. If the destination IP address maps to a subnet in a table, then the VIF is determined.

As an illustration, assume a destination IP address 7.7.7.7.25 to be reached from public gateway router 2. This address falls within the learnt subnet 7.7.7.7/24 of Table 8. This subnet is in the second row of Table 8 and corresponds to VIF 4. Accordingly, the packet will be routed through VIF 4.

As another example, consider that a packet is to be sent to destination IP address 3.3.3.25 for private gateway router 1. This address falls within the learnt subnet 3.3.3.3/24 of the second row of Table 5. The corresponding VIF of the second row is VIF 2.

While not shown in the example tables, it may happen as shown in FIGS. 3 and 4 that there is more than one route or connectivity mechanism for a particular destination IP address. This may include more than one VIF or other cross-connection tunnel, including VPNs. The administrator may select a preference. There may be a configured user preference. The administrator may access user preferences or use default settings, depending on the particular purpose and application for the routing determination.

While the example topologies of FIGS. 3 and 4 are simple, the hybrid network is likely to have many more nodes than are shown in FIG. 2 and it may be more difficult to generate a complete network topology. In such a case, various fetching mechanisms may be used together to explore connectivity among the various nodes. In some embodiments, the show BGP neighbor commands may be used and then followed up with additional fetches to explore additional nodes as they are discovered. Such a hybrid topography aids in determining the tables described above.

Figure 5:
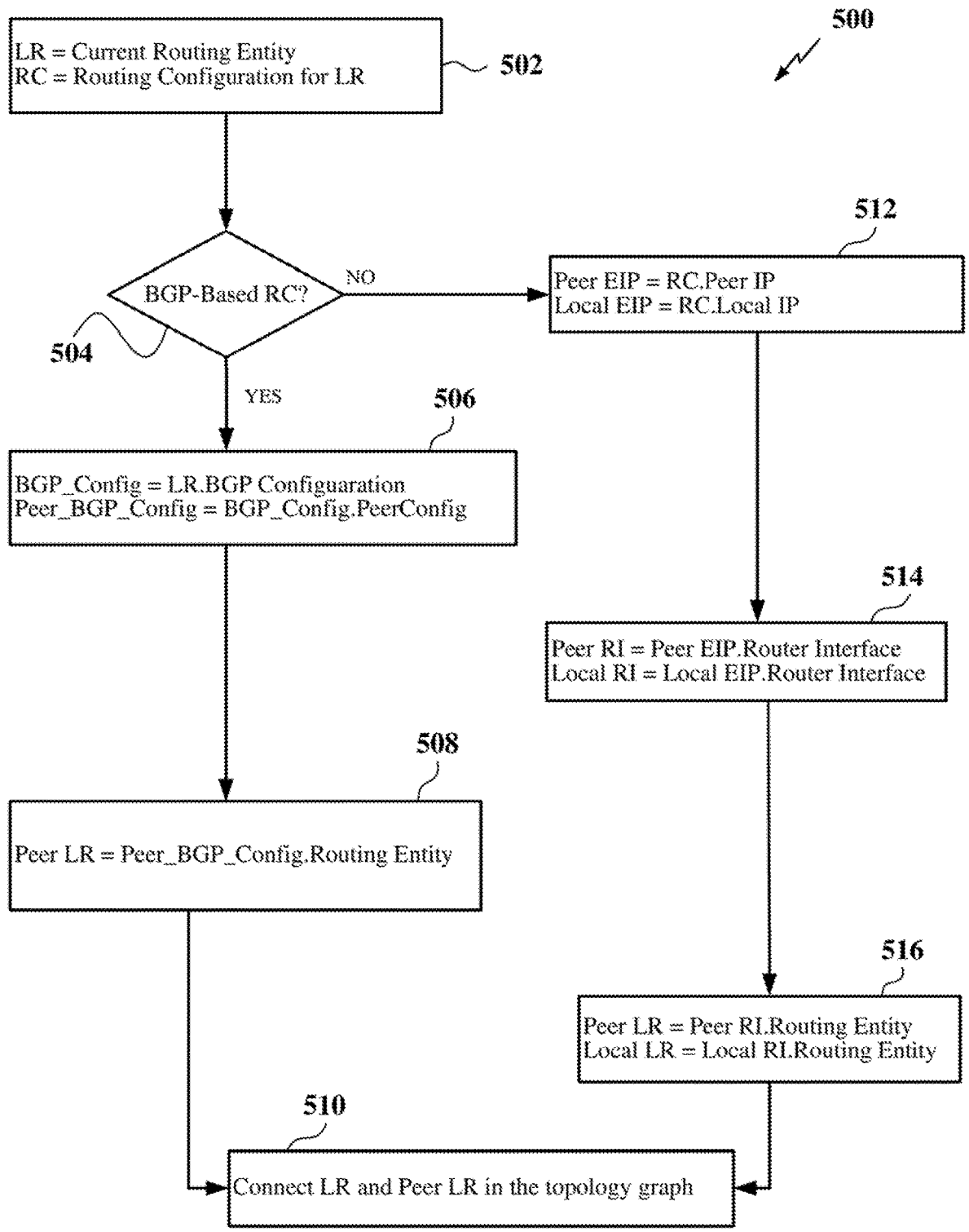
FIG. 5 is a process flow diagram of a method for building a network topology in accordance with an embodiment of the invention.

FIG. 5 is a process flow diagram 500 that illustrates example operations for connecting local and peer routing in a graph of a network topology. At block 502, LR and RC are defined as LR=Current Routing Entity, and RC=Routing Configuration for LR. Peer LR will be used to refer to the remote Peer LR, such as the cloud perimeter edge of Table 4, above. The routing configuration refers herein to a flat list of subnets or subnetworks. This list includes local and remote identifiers for a particular connectivity mechanism as shown, for example in Tables 3 and 4, that are received by the administrator from a routing entity. The local routing configuration is that of the on-premise routing entity. The remote routing configuration is that of the cloud provider of any type.

After the routing tables and network-interface layer information are collected from each known perimeter node, using for example, the show commands described above, then this information is analyzed for each node. The routing tables may include a flat list of subnets for each node. At block 504, the routing configuration is analyzed to determine if a VPN or peering type of connectivity mechanism is used. This can be represented as a choice between Table 3 and Table 4 above. The example operation is expressed as "BGP-based RC?"

If the routing configuration is based on BGP, then, at block 506, equivalents are declared or inferred for the values in the retrieved tables. These are stated as: 1) BGP_Config=LR.BGP Configuration and 2) Peer_BGP_Config=BGP_Config.PeerConfig. In other words, the values for the local and peer BGP configurations are determined based on values in the retrieved routing tables. At 508, the remote perimeter edge node routing information is determined using the peer BGP configuration. This is expressed as Peer LR=Peer_BGP_Config.Routing Entity.

With the configurations defined and compared, the connections are added to the graph of the network topology at block 510, which states Connect LR and Peer LR in the topology graph. This has been described with reference to Table 3 in which the addresses are matched to relate connections between matching addresses so that the on-premise and cloud provider perimeter edge routers are connected through the routing configurations.

When the local routing configuration is not based on BGP at block 504, then the process goes to block 512 at which external IP addresses are identified and defined: 1) Peer EIP=RC.Peer IP; and 2) Local EIP=RC.Local IP. In other words, the remote or peer external IP addresses are defined as the routing configurations for the peer IP addresses. Similarly, the local or on-premises external IP addresses are defined as the routing configurations for the local IP addresses.

At block 514, the router interfaces are defined using the retrieved routing configurations. In this case, the peer or remote router interface is defined using the external IP addresses. This is expressed as Peer RI=Peer EIP.Router Interface. Similarly, the local or on-premise router interface is defined using the local external IP addresses with a statement that Local RI=Local EIP.Router Interface.

With the addresses and interfaces defined at block 512 and block 514, at block 516, the routing entities are inferred so that the peer, remote, or cloud provider routing entity, depending on the structure of the hybrid topology, is determined. Similar to the BGP example, in this case the definition is stated as Peer LR=Peer RI.Routing Entity. These connections between routing entities have been made using the external IP addresses based on a VPN-type connectivity mechanism and can be added to the network topology at 510. As mentioned above, these additions to the network topology may be done including vendor-specific entity extensions.

Figure 6:
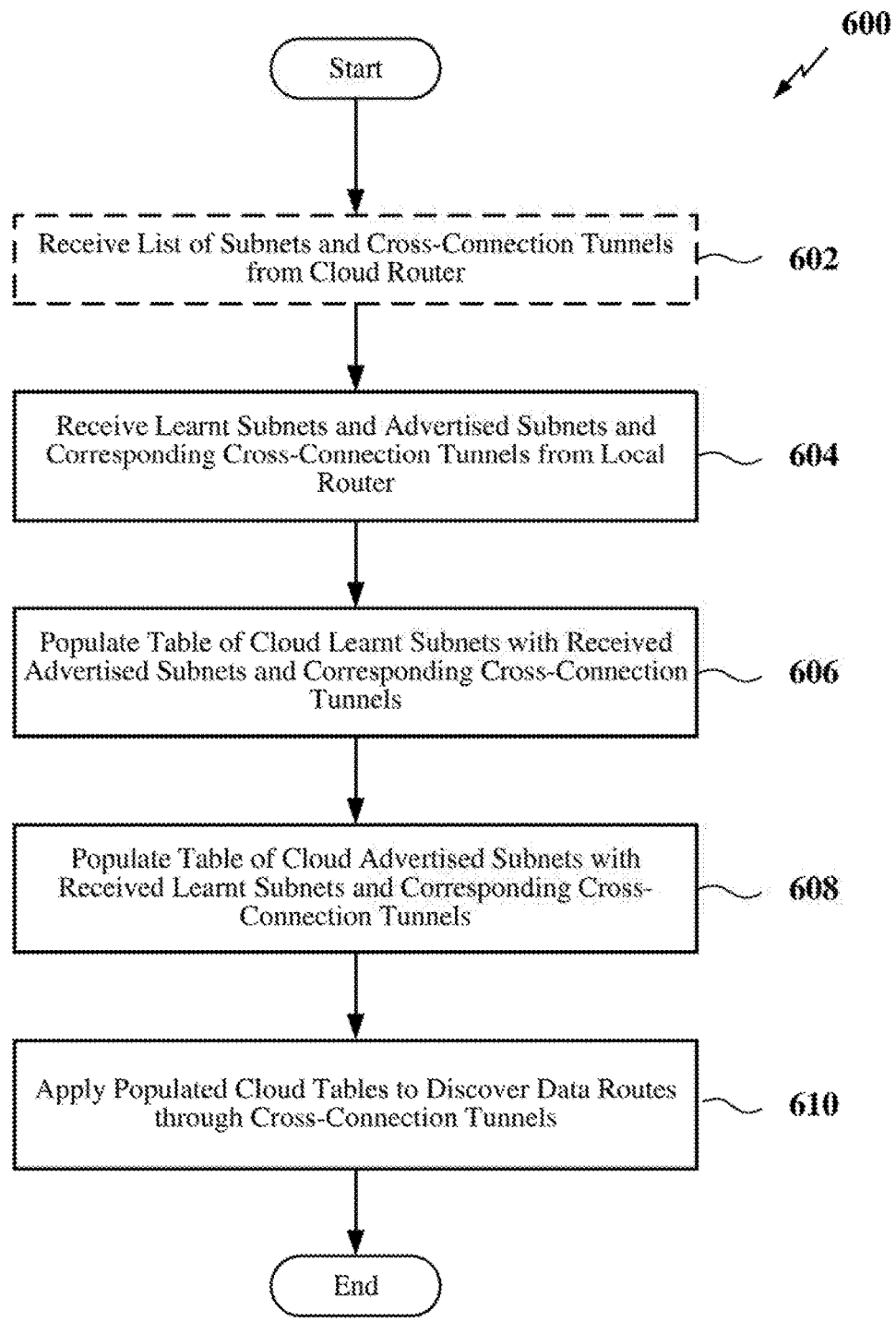
FIG. 6 is a process flow diagram of determining data routes in a hybrid cloud environment in accordance with an embodiment of the invention.

FIG. 6 is a process flow diagram of a method 600 of determining a data route in a hybrid cloud environment through a cross-connection tunnel. The method may optionally begin at a block 602 in which an aggregated flat list of subnets and a list of cross-connection tunnels for learnt and advertised subnets is received from a cloud edge router such as a public gateway router as discussed above. The list may be received in response to any of various different requests or commands to the cloud edge router. An incomplete table of cross-connection tunnels may be generated based on this list. This information may alternatively be obtained in other ways including by analysis of a network topology.

At block 604, routing configurations are received from a local edge router. The configurations include local learnt and advertised subnets from a local edge router such as a local perimeter edge router or the private gateway router discussed above. The received configurations are related to one or more corresponding cross-connection tunnels for the learnt and advertised subnets. As described above, in a BGP configuration, this configuration information may be obtained as replies to show BGP neighbor commands sent to the cross-connection tunnels. The commands may also be sent to other nodes of the peering configuration. For such requests, the received routing configurations are received from BGP peers and include information such as BGP neighbor IP addresses, BGP neighbor local ASNs, local IP addresses and local BGP ASNs. Alternatively, the local router may be the actual cross-connection tunnel reporting on its own learnt and advertised subnets.

In some embodiments, the cross-connection tunnels are discovered by the local router using suitable pinging messages or commands. Probe messages may be sent to the local router, such as the edge router, of the known local network and to any later discovered neighbors of the local router. The routing configurations are received as replies to at least a portion of the probe messages from the local router.

At block 606, a table of cloud learnt subnets is populated with the advertised subnets from the local router and the corresponding received cross-connection tunnels for the respective subnets from the local router. At block 608, a table of public cloud advertised subnets is populated with the learnt subnets from the local router and the corresponding received cross-connection tunnels for the respective subnets from the local router. This may be the same table as in block 606, or the tables may be combined into a single table or both tables may be maintained. While the information is described and shown as being in a table, any other suitable data structure may be used that allows the subnets and cross-connection tunnels to be associated.

At 610, the populated cloud tables of learnt subnets and of advertised subnets are applied to discover data routes through the cross-connection tunnels of the hybrid cloud environment. As mentioned there may be different types of cross-connection tunnels including virtual interfaces and VPN's.

A data route may be discovered by associating a destination IP address within the range of a learnt subnet of the local router with a corresponding cross-connection tunnel. The corresponding cross-connection tunnel is provided by reference to the table of subnets. The results of such associations may be stored in a list of destination IP routes for later reference, for traffic mapping, for troubleshooting and for other purposes. When the destination IP address is also reachable via the local router with a virtual private network (VPN) instead of a VIF, the corresponding learnt subnet may also be associated with the corresponding VPN.

Embodiments herein are described in the context of receiving lists, populating tables, and applying tables to certain purposes. Lists and tables are presented herein to provide a convenient reference for illustration and human understanding. However, a literal table is not required and any data structure that allows for the association of cross-connection tunnels with subnetworks may be used instead. In some embodiments, the data structure also allows for associations with IP addresses and ASN's among other routing constructs. The term "table" is to be construed herein as referring to any associative data structure that is suitable for carrying the information and associations described herein. The term "list" is to be construed herein as referring to any set of multiple data whether sorted or unsorted.

Embodiments herein are described in the context of learnt subnets and advertised subnets. Given two connected routers A and B, the learnt subnets for router A are the subnets that are received from router B and which are potentially reachable from router B either via a route in the routing table or some other mechanism. Given the same two connected routers A and B, the advertised subnets for router B are the subnets that are potentially reachable via router B and which are published to neighboring router A. The subnets are "potentially" reachable in that, for example, B is aware of the mechanism to reach the potentially reachable subnet (via routing table or other mechanisms). However, that reachability may include subnets reachable through more downstream routers (C, D . . . Z) so that B is just acting as a forwarder. The actual reachability is based on the health and availability/configuration of the downstream routers.

The description is presented in the context of learnt and advertised routes for BGP neighbors. This is because BGP is commonly used and commands, such as the show commands above, are readily available and well understood. However, BGP is not the only mechanism through which learnt and advertised routes are retrieved and published and the embodiments described herein are not so limited.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer.

As described above, each virtual machine includes a guest operating system in which at least one application runs. These embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method of determining data routes in a hybrid cloud environment through cross-connection tunnels, the method comprising:
   receiving routing configurations including learnt and advertised subnets from a local edge router in a private cloud, the received configurations including cross-connection tunnels for the learnt and advertised subnets;
   populating a public cloud table of public cloud learnt subnets with the advertised subnets from the local edge router and the corresponding received cross-connection tunnels for the respective subnets from the local edge router;
   populating a public cloud table of public cloud advertised subnets with the learnt subnets from the local edge router and the corresponding received cross-connection tunnels for the respective subnets from the local edge router; and
   applying the populated public cloud tables of learnt subnets and of advertised subnets to discover data routes through the cross-connection tunnels of the hybrid cloud environment, wherein discovering data routes comprises associating a destination Internet Protocol (IP) address within the range of a learnt subnet of the local edge router with a corresponding cross-connection tunnel.

2. The method of claim 1, wherein the routing configurations are BGP (Border Gateway Protocol) routing configurations.

3. The method of claim 1, wherein the cross-connection tunnels comprise cross-connection tunnels discovered by the local edge router.

4. The method of claim 1, wherein the cross-connection tunnels comprise virtual interfaces (VIFs).

5. The method of claim 1, further comprising:
receiving an aggregated flat list of subnets and a list of cross-connection tunnels for learnt and advertised subnets from a public cloud router and
generating an incomplete table of cross-connection tunnels.

6. The method of claim 1, wherein receiving the routing configurations comprises receiving BGP routing configurations from border gateway protocol peers of the local edge router.

7. The method of claim 6, wherein the border gateway protocol peers include known cross-connection tunnels.

8. The method of claim 6, wherein the received routing configurations include border gateway protocol (BGP) neighbor IP addresses, BGP neighbor local autonomous system numbers (ASNs), local IP addresses and local BGP ASNs.

9. The method of claim 1, wherein discovering data routes comprises:
associating a destination IP address within the range of an advertised subnet of the local edge router with a corresponding learnt subnet of a cross-connection tunnel; and
storing the result of the association in a list of destination IP routes.

10. The method of claim 9, wherein the destination IP address corresponds to two different cross-connection tunnels, and wherein associating the corresponding learnt subnet with the corresponding cross-connection tunnel comprises:
selecting one of the two different cross-connection tunnels using a pre-programmed preference; and
associating the corresponding learnt subnet with the selected corresponding cross-connection tunnel.

11. The method of claim 10, wherein the destination IP address is also reachable via the local edge router with a virtual private network (VPN), and wherein associating the corresponding learnt subnet with the corresponding cross-connection tunnel comprises associating the corresponding learnt subnet also with the VPN.

12. The method of claim 1, further comprising:
sending probe messages to the local edge router, and
wherein receiving the routing configurations comprises receiving replies to at least a portion of the probe messages from the local edge router.

13. The method of claim 12, wherein sending the probe messages comprises sending probe messages to neighbors of the local edge router in accordance with BGP and wherein receiving the routing configurations comprises receiving routing configurations for learnt and advertised subnets from the neighbors.

14. The method of claim 13, wherein the routing configurations include local autonomous system numbers (ASN), BGP ASNs, local IP addresses, and BGP Neighbor IP addresses and associated cross-connection tunnels.

15. A non-transitory computer-readable storage medium containing program instructions for a method of determining data routes in a hybrid cloud environment through cross-connection tunnels, wherein execution of the program instructions by one or more processors of a computer causes the one or more processors to perform steps comprising:
receiving routing configurations including learnt and advertised subnets from a local edge router of a private cloud, the received configurations including cross-connection tunnels for the learnt and advertised subnets;
populating a public cloud table of public cloud learnt subnets with the advertised subnets from the local edge router and the corresponding received cross-connection tunnels for the respective subnets from the local edge router;
populating a public cloud table of public cloud advertised subnets with the learnt subnets from the local edge router and the corresponding received cross-connection tunnels for the respective subnets from the local edge router; and
applying the populated public cloud tables of learnt subnets and of advertised subnets to discover data routes through the cross-connection tunnels of the hybrid cloud environment, wherein discovering data routes comprises associating a destination Internet Protocol (IP) address within the range of a learnt subnet of the local edge router with a corresponding cross-connection tunnel.

16. The medium of claim 15, the steps further comprising:
receiving an aggregated flat list of subnets and a list of cross-connection tunnels for learnt and advertised subnets from a public cloud router and
generating an incomplete table of cross-connection tunnels.

17. The medium of claim 15, wherein the cross-connection tunnels comprise cross-connection tunnels discovered by the local edge router.

18. A system of determining data routes in a hybrid cloud environment through cross-connection tunnels, the system comprising:
a memory; and
at least one processor configured to:
receive routing configurations including learnt and advertised subnets from a local edge router of a private cloud, the received configurations including cross-connection tunnels for the learnt and advertised subnets;
populate a public cloud table of public cloud learnt subnets with the advertised subnets from the local edge router and the corresponding received cross-connection tunnels for the respective subnets from the local edge router;
populate a public cloud table of public cloud advertised subnets with the learnt subnets from the local edge router and the corresponding received cross-connection tunnels for the respective subnets from the local edge router; and
apply the populated public cloud tables of learnt subnets and of advertised subnets to discover data routes through the cross-connection tunnels of the hybrid cloud environment, wherein discovering data routes comprises associating a destination Internet Protocol (IP) address within the range of a learnt subnet of the local edge router with a corresponding cross-connection tunnel.

19. The system of claim 18, wherein the cross-connection tunnels comprise cross-connection tunnels discovered by the local edge router.

20. The system of claim 18, wherein receiving the routing configurations comprises receiving BGP routing configurations from border gateway protocol peers of the local edge router and wherein the border gateway protocol peers include known cross-connection tunnels.

\* \* \* \* \*